United States Patent [19]

Kamata

[11] 4,281,907

[45] Aug. 4, 1981

[54] ARRANGEMENT FOR ADJUSTING A MEMBER IN A LENS BARREL FOR EFFECTING A ZOOMING FUNCTION ZOOM LENSES

[75] Inventor: Shigeru Kamata, Tokyo, Japan

[73] Assignee: Canon Kabushiki Kaisha, Tokyo, Japan

[21] Appl. No.: 64,806

[22] Filed: Aug. 8, 1979

[30] Foreign Application Priority Data

Aug. 21, 1978 [JP] Japan .................. 53-114783[U]

[51] Int. Cl.³ .................................. G02B 7/10
[52] U.S. Cl. .................................... 350/427
[58] Field of Search .............. 350/187, 255, 427

[56] References Cited

U.S. PATENT DOCUMENTS

| 2,493,463 | 1/1950 | Morgan et al. | 350/255 |
| 2,984,167 | 5/1967 | Staubach | 350/187 |
| 3,897,998 | 8/1975 | Someya et al. | 350/187 |
| 4,012,124 | 3/1977 | Toda et al. | 350/187 |

FOREIGN PATENT DOCUMENTS 53-54655 10/1976 Japan .................. 350/187

Primary Examiner—Jon W. Henry

[57] ABSTRACT

In a lens barrel provided with a cam member having a cam portion for controlling the optical distance of a zoom lens system, and a sliding movement guide member for rotatably holding the cam member at a predetermined position on the optical axis and for causing the lens system to move straight in an opitical axis direction, in order to rotatably hold the above-described cam member at the optical predetermined position on the slidable guide member, there are provided a region for adjusting axial movement of the cam member between the cam member and the slidable guide member, and an inhibiting device for inhibiting axial movement of the cam member relative to the slidable guide member after the adjustment has been effected. Accordingly, the assembly and adjusting operations of the barrel are facilitated.

2 Claims, 9 Drawing Figures

ARRANGEMENT FOR ADJUSTING A MEMBER IN A LENS BARREL FOR EFFECTING A ZOOMING FUNCTION ZOOM LENSES

BACKGROUND OF THE INVENTION

1. Field of the Invention

The present invention is related to a zoom lens mounting device.

2. Description of the Prior Art

In an encasing barrel, there are fitted a sliding movement guide sleeve having longitudinally straight grooves for moving an optical lens system straight within the barrel in response to the zooming operation of a zoom control ring to vary the zoom ratio of the movable parts of the optical lens system and a cam sleeve provided with cam grooves for moving a front lens system and a rear lens system of the lens optical system along predetermined curves to obtain an optical distance between the front and rear lens system. The lens holding rings are moved in engagement with the above-described longitudinal straight grooves and cam grooves at the intersections thereof. The relative angular position of the guide and cam sleeves must be adjusted by taking into account the distance from the rear lens group of the lens optical system to the film plane in the camera (the so-called back focal length).

In the prior art, the method of adjusting the reference position of the movement of lens holding rings within the barrel is to make use of a washer having a certain thickness inserted between the stationary support sleeve of the interchangeable lens and the mount member thereof so that the abovedescribed distance is established. (This distance adjusting washer will be hereinafter referred to as a "focus washer").

FIG. 1 shows a conventional adjusting method using such focus washer.

Element 1 is a male mount member on the interchangeable lens side, and the mount member is fixed to a fixing sleeve 3 of the lens barrel by tightening and fixing members (not shown).

The fixing sleeve 3 is provided with straight grooves 3a, 3b along the direction of the optical axis.

Element 4 is a cam sleeve rotatably fitted on the outer periphery of the fixing sleeve about the optical axis and cooperative with a control ring (not shown). In the cam sleeve, there are provided cam grooves 4a, 4b formed on the periphery of the cam sleeve as shown by dashed lines. Elements 5, 6 are holding rings for holding a first lens group 9 and a second lens group 10 in an axially movable manner, being fitted in the inner diameter of the fixing sleeve 3.

Elements 7, 8 are pins outwardly extending from the holding rings 5, 6 through the straight grooves 3a, 3b of the fixing sleeve 3 into the cam grooves 4a, 4b of the cam sleeve 4. In FIG. 2, the intersections of the straight grooves 3a, 3b and the cam grooves 4a, 4b at which the pins 7, 8 stand are defined as the movement reference position.

With the construction described above, when the control ring (not shown) is rotated, the cam sleeve is rotated in unison with the control ring, causing the holding rings 5, 6 to axially move with the pins 7, 8 along the intersections of the cam grooves 4a, 4b and the straight grooves 3a, 3b.

In the conventional lens barrel, the distance adjustment between the film plane in the camera and the movement reference position of the second lens group 10 (so-called "back focus" adjustment) is made by inserting a washer 2 between the fixing sleeve 3 and the mount member 1. At the time of assembly, therefore, the distance between the film plane and the second lens group must be measured, and a washer whose thickness is equal to the deviation from the true distance must be selected for insertion. It follows that the tightening and fixing operation of the mount member must be repeated as many times. Thus, the improper arrangement due to the possible range of variation of the tightening force, the degree of complication of the work, the influence of time-consuming work on the cost of assembly, and the preparation of a wide variety of washers of different thickness because tolerances of the individual parts result in many problems.

Reference is made to prior application Japanese Open Utility model No. Sho 53-54655 which is relevant to the above-identified field of art.

FIG. 3 shows an embodiment described in said Utility Model No. Sho 53-54655. This embodiment comprises an inner sleeve 11 of certain length in which first to fourth lens cells are movably fitted in spaced relation to one another; a stop ring 13 is mounted at the front end of the inner sleeve to hold a distance adjusting ring 12; a cam sleeve 14 is fitted on the outer periphery of the inner sleeve 11 to control the relative position of the above-described lens group; play gaps, t, for adjustment are arranged on the inner sleeve 11 at the front and rear of the cam sleeve; thrust rings 15, 16 are rotated onto the threaded end portion 14a to fix the above-described cam sleeve 14 in position; finally, the rear end of the inner sleeve is fixed to a support tubular body 17 of the lens barrel.

The above-described parts are assembled so that the cam sleeve 14 is brought into engagement with the inner sleeve 11, then moved to effect adjustment to a predetermined position relative to the barrel body 17, then the thrust rings 15, 16 are rotated to axially move to the left and right for tightening purposes so that the position of the cam sleeve 14 relative to the inner sleeve 11 is adjusted, and then the thrust rings 15, 16 and cam sleeve 14 are fastened to the inner sleeve 11, by set screws 18, 19.

The above-described invention makes use of thrust rings 15, 16 and set screws 18, 19 as the means for fixing the cam sleeve 14 to the inner sleeve 11 and covers its outer periphery with a distance adjusting sleeve 12.

The zoom lens mounting device according to the above-described invention has, among others, a disadvantage in that the number of parts is large. Another disadvantage is that the distance adjustment of the cam sleeve 14 must be performed by repeating the tightening and loosening operation of the thrust rings 15, 16, and the set screws 18, 19.

SUMMARY OF THE INVENTION

An object of the present invention is to provide a mounting device for a zoom lens capable of performing adjustment of a cam member of the zoom lens with high accuracy and ease.

Another object of the present invention is to provide a zoom lens of such construction that, while the cam member remains held in a predetermined axial position of a sliding movement guide member, the rotational operation about the optical axis can be smoothly performed.

Still another object of the present invention is to provide a structure of a zoom lens barrel capable of performing fine adjustment of the cam member in the axial direction with ease and accuracy and of finishing the assembling and adjusting operation in a very short time.

A further object of the present invention is to provide a method and apparatus for adjustably mounting a zoom lens so that, when a necessity of fine adjustment of the cam member arises after the zoom lens has been mounted within its encasing barrel, the fine adjustment can be performed while permitting the various parts of the lens mounting to remain assembled.

In accordance with the invention, a mechanism for adjusting the position of a cam member which contributes to the zooming effect in a lens barrel of a zoom lens comprises a fixing member having a guide for axially moving a photo-taking lens and a cam member having a cam groove for performing the zooming operation of the photo-taking lens in cooperation with the guide. The cam member is fitted to the fixing member and has a range of axial movement relative to the fixing member. Also included are means for restraining the cam member from axial movement, while permitting a certain range of rotational movement of the cam member about the optical axis. The restraining means has a groove provided in the outer peripheral surface of the cam member in a direction concentric to the optical axis, an eccentric roller fitted in the groove to displace the cam member in the axial direction and a fastening member for fastening the cam member through the eccentric roller in predetermined axial direction so that the adjustment of axial displacement of the cam member is performed.

For a better understanding of the present invention, reference is made to the following description and accompanying drawings while the scope of the invention is pointed out in the appended claims.

DESCRIPTION OF THE PREFERRED EMBODIMENTS

Figure 4:
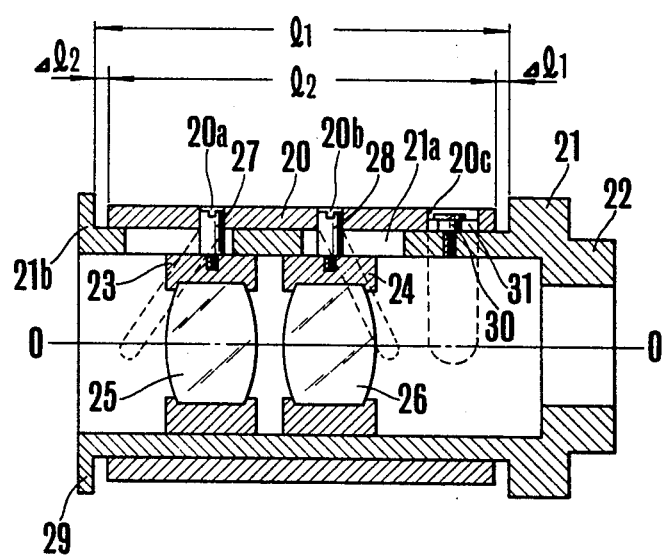
FIG. 4 is a sectional view and FIG. 5 is a fragmentary expanded view showing the construction of a cam member and a fixing barrel member in a lens mounting according to the present invention.
Figure 5:
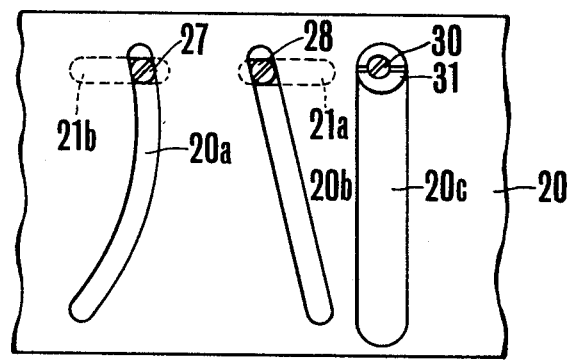

FIGS. 4 and 5 show the principles of construction of a cam member 20 and a fixing member 21 of a zoom lens barrel according to the present invention. In the figures, the fixing member 21 is fixedly mounted in unison with a mount member 22 which couples the lens barrel with a camera (not shown). Elements 23, 24 are lens retaining members for holding first and second optical systems 25, 26 fitted in the inner diameter of the fixing member 21. Pins 27, 28, affixed to the lens retaining members 23, 24, extend through respective intersections of guides 21a, 21b such as straight grooves provided in the fixing member 21 along the optical axis and arcuate cam grooves 20a, 20b formed in the cam member 20 (see FIG. 5).

The axial length, l1, of the fixing member 21 bearing the cam member 20 is made longer than that, l2, of the cam member 20 by a length $\Delta l1 + \Delta l2$, so that when the cam member 20 is fitted over the fixing member 21, there is created a range of axial movement. An intermediate cylinder 29 has internal screw threads.

Element 20c is a groove formed in the cam member 20 in a direction perpendicular to the optical axis 0—0. Element 30 is a screw threaded into the fixing member 21 and engaged in the above-described groove 20c through an eccentric roller 31.

By appropriate means (not shown), a prescribed distance from a predetermined reference position of the fixing member 21 or the mount member 22 to the lens optical systems 25, 26 is measured. Then, by rotating the screw 20 and eccentric roller 31, the cam member 20 is axially moved for adjustment relative to the fixing member 21. After the above-described distance has been attained, the eccentric roller 31 is fastened by the screw 30 to restrain the cam member 20 and fixing member 21 from relative axial movement.

By the above-described adjustment, the movement reference position of the lens optical system 25, 26 is determined upon rotation of the cam member 21 to control adjustment of the distances between the two lens optical systems and between the lens and a film plane in the camera (not shown). Thus, the lens optical systems 25, 26 are moved in differential relationship by the cam curvature grooves 20a, 20b to effect variation of the magnification of an object image and compensation for the image shift.

During the zooming operation, the cam member 20 is inhibited from axial movement as it is held in the fixing member by the restraining means comprised of the circumferential groove 20c, screw 30, and eccentric roller 31.

Figure 1:
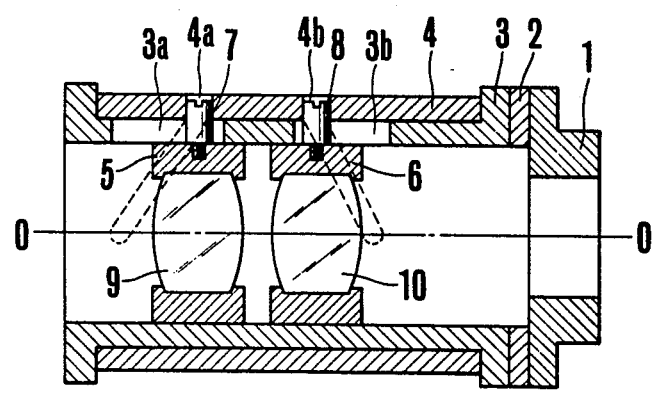
FIG. 1 is a sectional view of the main parts of a conventional lens mounting mechanism generally accepted in the field of art of the present invention.
Figure 2:
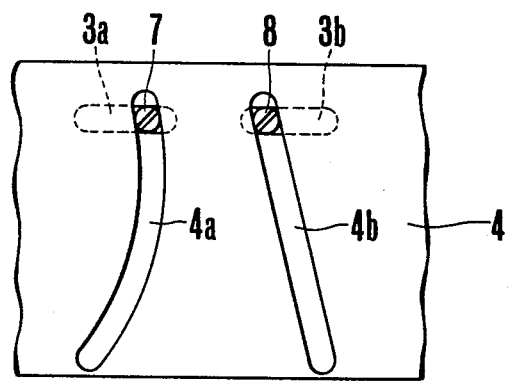
FIG. 2 is a fragmentary expanded view of the cam member 4 shown in FIG. 1.
Figure 3:
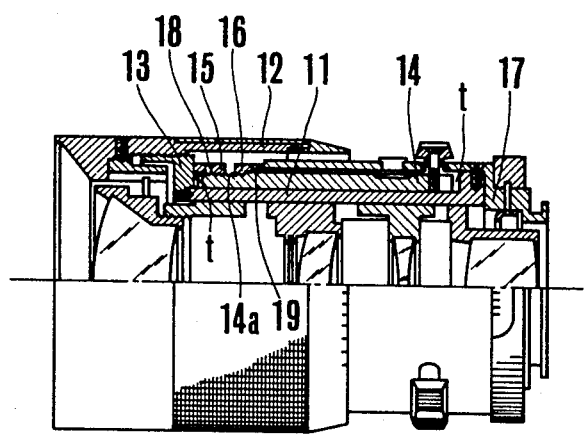
FIG. 3 is a sectional view of an embodiment of a lens mounting in the prior application of the present invention.
Figure 6:
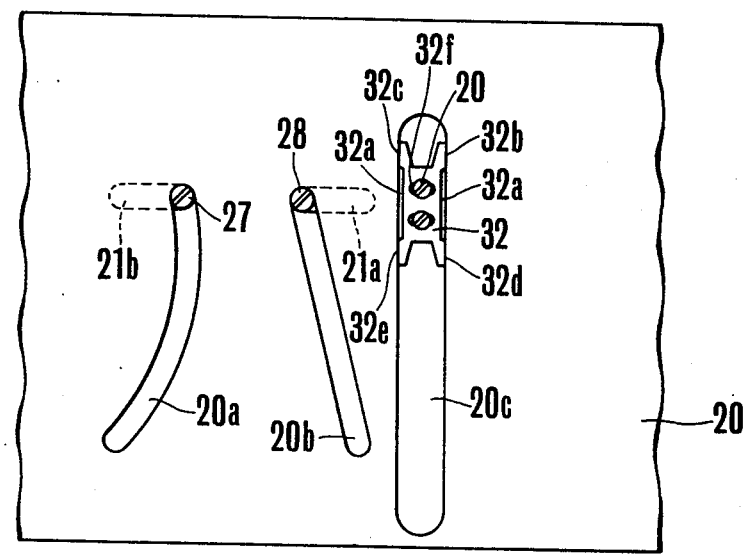
FIG. 6 is a fragmentary expanded view of another embodiment of the cam member according to the present invention.

FIG. 6 is an expanded view of a cam member showing another embodiment of the above-described adjusting means. The embodiment of FIG. 6 replaced the above-described eccentric roller 31 by a resilient member 32 having a rigid portion and an elastic portion simultaneously.

In the resilient member 32, there is a rigid portion 32a constituting a body portion of the resilient member and whose width and thickness are so sufficient that no elasticity is produced.

Elements 32b, 32c, 32d, and 32e are elastic portions extending from the body portion 32a of the resilient member in the fork form whose width and thickness are so narrow and thin as to produce elasticity. Thus, they function as leaf springs. Element 32f has elongated holes through which screws 20 extend to fasten the resilient member within the groove 20c shown in FIG. 4.

The width of the groove 20c is pre-adjusted to a value lying between the width of the body portion of the resilient member and the natural length across both ends of the leaf springs. By tightly fastening the resilient member 32 to the fixing member or barrel by the screws after the resilient member 32 has been inserted into the groove 20c and after the distance between the cam member 20 and the film plane has been set to a prescribed standard value, it is possible to determine the rotation reference position of the movable sleeve. When use is made of the resilient member of FIG. 6, the elastic force of the leaf springs 32b, 32c, 32d, and 32e and the tightening force of the screws insure that the axial standard position of the cam sleeve 20 and the fixing member 21 is fixed without shift, and that the adjustment of the axial position of the cam sleeve 20 and fixing sleeve 21 can be very easily performed with the use of the elongated holes 32f of the resilient member 32.

Figure 7:
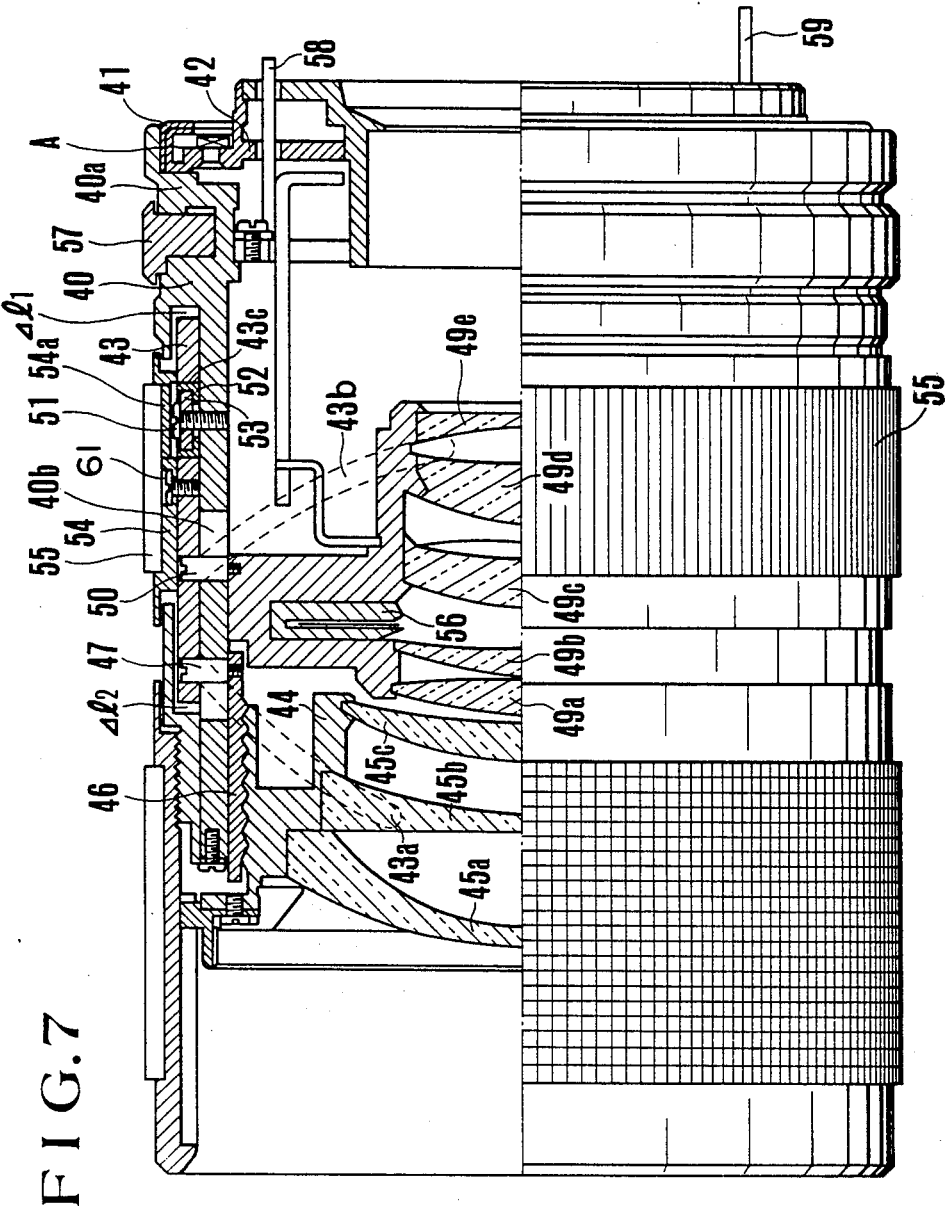
FIG. 7 is a partly side elevational partly sectional view of a zoom lens mounting mechanism employing the principles of the present invention.

FIG. 7 is a zoom lens mounting mechanism embodying FIGS. 4 and 5. In the figure, element 40 is a fixing barrel and element 40a is a mount portion which communicates with the fixing barrel 40 and whose inner diameter holds lens sides mount means and whose inner diameter holds lens sides movement means (bayonet means) 41 constructed to be coupled with camera side mount means (not shown). Element 42 is an adapter member rotatable relative to the fixing barrel 40a and restrained from axial movement. The adapter member 43 is adjusted in position to the mount means in the camera and is fixed in a predetermined position in the camera when the zoom lens is attached to the camera. Then, by the rotational operation of the fixing barrel, and a barrel member, ring member associated therewith, the lens side mount means 41 is brought into engagement with the camera side mount means. In this way, the lens is coupled with the camera.

Element 43 is a cam member fitted over the fixing barrel 40 and having cam grooves 43a, 43b for relative distance adjustment of the optical lens. Element 44 is a lens retaining member for holding an optical lens system 45a, 45b, 45c, ..., helicoid-coupled with an intermediate member 46. A pin (shaft) 47 affixed to the intermediate member 46 extends through a straight groove 40b formed in the above-described fixing barrel 40 into a cam groove 43a of the above-described cam member 43.

Element 48 is a lens retaining member for holding an optical lens system 49a, 49b, 49c, 49d, 49e, ..., and a pin (shaft) 50, affixed to the outer peripheral surface of the member 48, extends through the above-described straight groove 40b into a cam groove 43a of the cam member.

Between each of the ends of the cam member 43 in the axial direction and the fixing barrel 40, there exist adjustment regions $\Delta l1$, $\Delta l2$ for adjusting axial movement of the cam member. A screw 51, first roller 52, and eccentric roller 53 constitute adjusting means for permitting the rotational movement of the cam member, restraining the axial movement thereof, and performing the adjustment of the position of the cam member 43 and the fixing barrel 40. In the outer peripheral surface of the cam member 43 there is provided a groove 43c (corresponding to the groove 20c in FIG. 5) in a concentric direction with the optical axis. Within said groove 43c, are seated the first roller 52 and the eccentric roller 53 in fixedly secured relation to the fixing barrel 40 by the screws 51.

Element 54 is an encasing barrel connected in unison with the cam member 43 by a screw 55. The encasing barrel 54 has a penetrating hole (or slot) 54a so as to access the screw 51 of the above-described adjusting means from the outside. A decorated rubber ring 55 covers it.

Element 56 is a diaphragm unit incorporated in the lens barrel.

Element 57 is a diaphragm operating ring cooperative with a signal level 58 for transmitting the diaphragm blades of the above-described diaphragm unit and the diaphragm value manually set into the camera. It should be noted that the signal level 58 also functions to transmit the diaphragm value information from the camera to the diaphragm unit 56, as it cooperates with a presetting mechanism (not shown). Element 59 is an actuating signal lever for actuating the diaphragm unit by an actuating signal from the camera.

With the lens mounting device of the above-described construction, when in adjusting the distances from the predetermined reference position of the fixing barrel 40, for example, the A plane in FIG. 7, to a predetermined reference position (not shown) on the camera side, and from the A plane to a predetermined reference position of the optical lens system 49a, 49b, 49c, 49d, 49e (for example, the central position of the intersection of the straight groove 40b of the fixing barrel and the cam groove 43a of the cam member), it is possible to axially displace the cam member 43 relative to the fixing barrel to effect adjustment by rotating the screw 51 and the eccentric roller 52 from the penetrated hold 54a of the encasing barrel 54.

Figure 8:
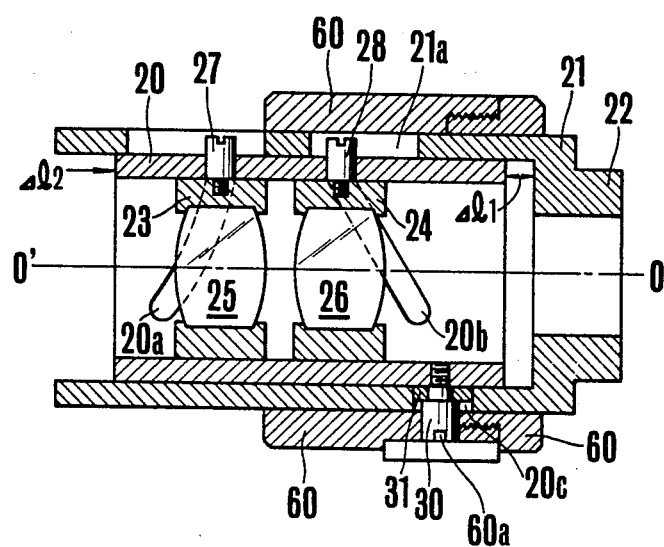
FIG. 8 is a sectional view showing another example of construction of the cam member and fixing barrel member of the present invention.
Figure 9:
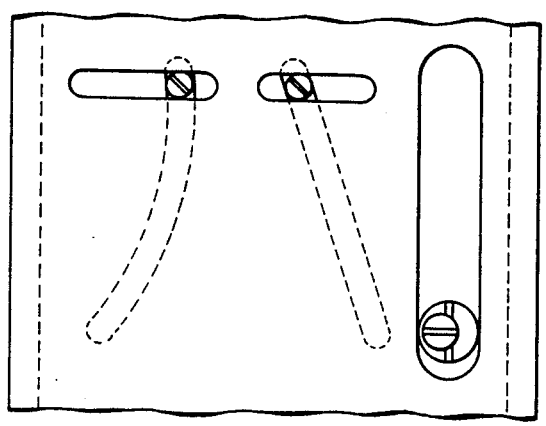
FIG. 9 is a fragmentary expanded view of the cam member if FIG. 8.

FIGS. 8 and 9 show another embodiment of the present invention. In the figures, the same reference characters have been employed to denote parts similar to those shown in FIGS. 4 and 5. This embodiment shows a case where the arrangement of the fixing member 21 and the cam member 20 is reversed as compared with the embodiment of FIGS. 4 and 5. In this embodiment, by forming a penetrated portion 60a through the zoom control ring 60 fitted over the fixing member 21 to accommodate a portion of the screw 30 of the above-described adjusting means, it is made possible to perform displacement for adjustment of the cam member 20 with reference to the fixing member 21 in the direction of the optical axis 0—0, and also to perform rotational operation of the cam member during zooming operation by utilizing the penetrated portion 60a.

It will be seen from the foregoing that the present invention provides a lens mounting device which enables fine adjustment of the relative position of the cam member 20, 43 to the fixing barrel 21, 40 in the axial direction to be performed in a very short time, and in few steps with a minimum of labor.

Further, the present invention is directed to imparting into the lens mounting mechanism a utility such that even after the various components of the lens mounting have been assembled, the adjusting operation can be easily performed without the likelihood of breaking the assembly as the operator accesses the adjusting means through the penetrated hold of the encasing barrel 54 or operating ring 60.

Though the guide means for axially moving the various lens components is shown as the straight grooves 20a, 21a, 40b, it is of course possible to employ another form of guide means, for example, a frame form for guiding the lens retaining members.

While the foregoing description and drawings represent the preferred embodiments of the present invention, it will be obvious to those skilled in the art that various changes and modifications may be made therein without departing from the spirit and scope of the present invention.

What is claimed is:

1. A mechanism for adjusting the position of a cam member which contributes to the zooming effect in a lens barrel of a zoom lens, comprising:
    (a) a fixing member having a guide for moving a photo-taking lens in an axial direction;
    (b) a cam member having a cam groove for performing the zooming function of the photo-taking lens in cooperation with the above-described straight guide, said cam member being fitted to said fixing member and having a range of axial movement with reference to said fixing member;
    (c) an encasing barrel connected in unison with the cam member by a fastening member; and
    (d) adjusting means for adjustment of the axial displacement of said cam member, said adjusting means being provided with a circumferential groove formed in the outer circumference round the optical axis of said cam member, an eccentric roller arranged to fit in the circumferential groove and a fastening member which pivotally carries said eccentric roller to permit the roller to rotate within said circumferential groove and also is arranged to carry said fixing member, said encasing barrel which is disposed over the circumferential groove of said cam member being provided with a piercing hole for permitting a rotating operation on said eccentric roller through said piercing hole.

2. A lens barrel for a zoom lens comprising:
    (a) a fixing member having a straight groove for moving a photo-taking lens in an axial direction;
    (b) a cam member having a cam groove for performing the zooming function of the photo-taking lens in cooperation with said straight groove, said cam member being fitted in the inner diameter of said fixing member, and having a range of axial movement with reference to said fixing member;
    (c) adjusting means capable of displacing said cam member in an axial direction and making it possible to rotate said cam member in a predetermined axial position by operation from the outside of said lens barrel, said adjusting means having an eccentric roller fitted in a groove formed in the cam member in a direction concentric with the optical axis, and a stationary means for holding said eccentric roller rotatably with reference to the cam member; and
    (d) operating means fitted in an outward direction of the fixing member to perform the zooming operation of the photo-taking lens, said operating means rotating the cam member in engagement with a part of said adjusting means at a predetermined axial position to perform the adjustment of magnification variation of the photo-taking lens, said operating means having a hole or slot engaging with said stationary means so that through said hole or slot it is possible to perform the adjusting operation of said adjusting means.

* * * * *